(12) United States Patent
Yang et al.

(10) Patent No.: US 7,417,786 B2
(45) Date of Patent: Aug. 26, 2008

(54) PARTICLES FOR ELECTROPHORETIC MEDIA

(75) Inventors: San-Ming Yang, Mississauga (CA); Naveen Chopra, Oakville (CA); Man-Chung Tam, Mississauga (CA); Peter M. Kazmaier, Mississauga (CA); Gabriel Iftime, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 413 days.

(21) Appl. No.: 11/093,857

(22) Filed: Mar. 30, 2005

(65) Prior Publication Data
US 2006/0222976 A1 Oct. 5, 2006

(51) Int. Cl.
G02B 26/00 (2006.01)

(52) U.S. Cl. ........................ 359/296; 259/295

(58) Field of Classification Search ................. 359/296, 359/295, 240, 238; 345/107, 85, 103
See application file for complete search history.

(56) References Cited

U.S. PATENT DOCUMENTS

| 5,961,804 | A |  | 10/1999 | Jacobsen et al. |
| 6,017,584 | A |  | 1/2000 | Albert et al. |
| 6,067,185 | A |  | 5/2000 | Albert et al. |
| 6,411,316 | B1 |  | 6/2002 | Shigehiro et al. |
| 6,517,618 | B2 |  | 2/2003 | Foucher et al. |
| 6,525,866 | B1 |  | 2/2003 | Lin et al. |
| 6,529,313 | B1 |  | 3/2003 | Lin et al. |
| 6,559,820 | B1 |  | 5/2003 | Mikkelsen, Jr. et al. |
| 6,657,612 | B2 |  | 12/2003 | Machida et al. |
| 6,724,519 | B1 | * | 4/2004 | Comiskey et al. ............ 359/296 |
| 6,750,843 | B2 | * | 6/2004 | Sakamaki et al. ........... 345/105 |
| 6,765,713 | B2 | * | 7/2004 | Yanagisawa ................. 359/296 |
| 6,850,357 | B2 | * | 2/2005 | Kaneko et al. .............. 359/296 |
| 2004/0130776 | A1 | * | 7/2004 | Ho et al. ..................... 359/296 |
| 2004/0217929 | A1 |  | 11/2004 | Albert et al. |
| 2005/0168799 | A1 | * | 8/2005 | Whitesides et al. ......... 359/296 |
| 2006/0139724 | A1 | * | 6/2006 | Liang et al. ................. 359/265 |

FOREIGN PATENT DOCUMENTS

WO  WO 02/093246  11/2002

* cited by examiner

*Primary Examiner*—Timothy J Thompson
(74) *Attorney, Agent, or Firm*—Pepper Hamilton LLP (57) ABSTRACT

Compositions of encapsulated triboelectrically charged particles and methods for making them using a spinning disc process are disclosed. The methods can be used to make charged pigment particles embedded in a neutral polymer matrix. The polymer matrix keeps oppositely charged pigment particle from agglomerating. The particles can be used for electrophoretic displays.

5 Claims, 5 Drawing Sheets

PARTICLES FOR ELECTROPHORETIC MEDIA

BACKGROUND

1. Technical Field

This disclosure relates to charged particles, such as those used in electronic paper-like displays, as well as methods for making such particles.

2. Description of the Related Arts

Paper-like displays based on the electrophoretic migration of electrophoretic particles are being developed for use in commercial displays document editing, and document retrieval. Examples of such displays are described in, for example, U.S. Pat. No. 6,517,618 to Foucher et al., U.S. Pat. No. 6,559,820 to Mikkelson Jr. et al., and U.S. Pat. No. 6,411,316 to Shigehiro et al., U.S. Pat. No. 5,961,804 to Jacobsen et al., U.S. Pat. No. 6,017,584 to Albert et al., and U.S. Pat. No. 6,067,185 to Albert et. al each of which is incorporated herein by reference in their entirety. In some examples, the electrophoretic particles may be provided in suspension and sandwiched between one or more transparent electrodes of the device.

Some such systems are one-particle systems, where a single type of particle (usually white) is dispersed in a dark dyed fluid. In a one-particle device, when the particles migrate to the top electrode, the device appears white. When the particles migrate to the bottom electrode, the white particles are hidden by the dyed fluid, and the device appears dark. Another example of a one-particle system involves bichromal rotating elements where each particle is bichromal, and the particles selectively rotate in response to an applied electric field to produce a two-color image. Other such systems are two-particle systems, where the display uses at least two types of particle groups. The particle groups have different color and charge characteristics with respect to each other and move differently when the electric field is applied. Examples of two-particle displays are disclosed in U.S. Pat. No. 6,657,612 to Machida et al., U.S. Pat. No. 6,525,866 to Lin et al., and U.S. Pat. No. 6,529,313 to Lin et al., each of which is incorporated herein by reference in its entirety.

One challenge in the development of two-particle electrophoretic displays is the particle design or structure. Each type of particle has to carry opposite charge so that the particles move in opposite directions in the electric field created by the electrodes. The interaction between these two oppositely charged particles should be minimal to prevent their agglomeration. In addition, the particles must possess the requisite chemical and thermal stability to permit their use in the display.

Current methodologies to make two particle electrophoretic display systems have focused on the use of different surface polymer coatings on the pigment particles to stabilize dispersions of the particles in the display. Examples of such coatings are disclosed in U.S. Patent Publication No. 2004/0217929, to Albert et al., and World Patent Application Publication No. WO02/093246, to Honeyman et al, which are incorporated herein by reference in their entirety. Coated pigment particles are difficult to manufacture with consistent performance and at low cost. These kinds of coated particles can suffer from unpredictable dispersion interaction and poor particle charging, which limits device reliability.

Electrophoretic particles that have a polymer coating on the particles may be suspended in liquid media. Because of their small size, for example, about one to about two micron-sized particles, agglomeration is a problem. To prevent particle agglomeration, various combinations of surface coating procedures and dispersants are used. However, the incorrect formulation of stabilizers and additives can have an adverse effect on image bistability, and the image may not persist. The optimum level of dispersant draws a fine line between dispersibility and image persistence. Furthermore, the stabilizer and dispersant additives are physioadsorbed onto the electrophoretic particles. Over time and continuous particle migration cycles, these additives can desorb from the particles and into the surrounding fluid. This can lead to high conductivity of the fluid, dispersion instability (agglomeration), and loss of electrophoretic mobility. For a two-particle system, the charging mechanism of the particles is more complicated than for a one-particle system. The two types of oppositely charged particles may interact with one another and agglomerate. This complicates the formulation of the system.

Another two-particle system is based on dry toners. In this case, toner particles typically of an about ten to about twenty micron size are filled in a micropatterned array and sandwiched between two electrodes. Only an air gap separates the two electrodes. The challenge is the uniform filling of large area grid patterns to accommodate the toner and the charging of toner by vigorous mechanical tumbling. In the dry toner system, high voltages of nearly 400 volts are used to migrate the toner back and forth across the air gap.

There is a need for electrophoretic particles and compositions containing them that form stable dispersions and can be used in electrophoretic media such as displays. It would be desirable to provide electrophoretic particles for use in such media at low operating voltages. Further, there is a need to make electrophoretic particles with easily controlled electrophoretic properties in commercially useful quantities and in a cost effective manner.

SUMMARY

Embodiments of electrophoretic particles and methods for making them may include triboelectrically charging pigment particles in a melted polymer matrix by moving the melted matrix and pigments across a heated surface and expelling the mixture or combination to form droplets. The released droplets may be cooled to form particles of triboelectrically charged pigment dispersed in or coated by the polymer matrix. In one embodiment, the pigment particles in the melted polymer matrix are charged by contact with a substrate that moves relative to the melted polymer and pigment particles. In one embodiment, the moving substrate may include a spinning disk.

One version of a method for making colored or achromatic colored electrophoretic particles for electrophoretic displays may include the acts of charging colored or achromatic colored pigment particles dispersed in a polymer matrix on a spinning disk. Pigment particles may be dispersed in a melted polymeric matrix onto a heated spinning disk and acquire a charge due to triboelectrical charging during the spinning process. The charged pigment particles become dispersed in the polymer matrix. By choice of pigment material, the pigment particles may be made with a desired magnitude of charge, polarity, and absorption or reflection. The charged pigment particles dispersed in the polymer matrix on the spinning disk may be released as droplets from the disk and may form spherical particles of charged pigment particles with a charged or neutral polymer shell around them. The polymer shell may reduce or prevent particle agglomeration. In one embodiment, black particles may be charged opposite to white particle using a spinning disk. The oppositely charged black and white electrophoretic particles may be mixed together with a dielectric fluid. In another embodiment, the charged particles and dielectric fluid may be encapsulated by another polymer that acts as a shell to form an electrophoretic capsule.

One version of a method to make achromatic or colored electrophoretic particles may include spinning a pigmented polymer melt on a rapidly rotating substrate or disk. The pigment particles become embedded inside the inert polymer matrix which reduces or prevents particle agglomeration. During the spinning process, the pigment particles are triboelectrically charged during the particle formation/encapsulation process and trapped inside the polymer matrix. Unlike traditional one- and two-particle electrophoretic inks, triboelectrically charging the pigment particles eliminates adding charge control agents to the polymer melt to enhance charging. The triboelectrically charged electrophoretic particles may have a size from about 5 to about 250 microns in one embodiment and from about 5 microns to about 50 microns in another embodiment. In one embodiment the electrophoretic particles may include positively charged black and negatively charged white electrophoretic particles that are suspended in a dielectric fluid, for example silicone oils, and sandwiched between two transparent electrodes, for example ITO plates, to form an electrophoretic display device.

One embodiment of a composition that may be used in electrophoretic display devices includes triboelectrically charged pigment particles dispersed in a polymeric matrix. One embodiment of an electrophoretic composition may include one or more triboelectrically charged pigment particles of like polarity dispersed in a melted polymer matrix. Another embodiment of an electrophoretic composition may include one or more triboelectrically charged pigment particles of like polarity dispersed in the polymeric matrix. The particles may include one or more triboelectrically charged pigment particles dispersed in the polymer matrix of each particle. The polymeric particles may be spheroidally shaped, ellipsoidal, substantially spherical, and/or spherical although other shapes are also possible. The particles of triboelectrically charged pigment dispersed in the polymer matrix may have an electrophoretic mobility and density suitable for use in an electrochromic display. The particles may be prepared to have a mass and size with a density similar to the dielectric fluid that may be used in the display; the particles may be near neutrally buoyant and may be suspended without settling in the dielectric fluid used in the electrochromic display. The electrophoretic particles of the composition may be switchable at about ±100 volts to about ±300 volts in an electrophoretic display, and they may have an electrophoretic mobility of from about $10^{-4}$ to about $10^{-6}$ $cm^2$ $sec^{-1}V^{-1}$. The particles of triboelectrically charged pigment dispersed in the polymer matrix may be suspended in a dielectric fluid in which they are nearly neutrally buoyant. The particles of triboelectrically charged pigment dispersed in the polymer matrix may be suspended in a dielectric fluid in which they are nearly neutrally buoyant and further encapsulated by a second polymer to form a capsule.

The polymer may have a melt viscosity that permits triboelectric charging of the pigment particles in the melt as they move across a substrate. In one embodiment the viscosity of the polymer matrix melt may be less than about 50 centipoise. In another embodiment the viscosity of the polymer melt may be from about 5 to about 50 centipoise. In one embodiment the polymer melt can include an additive that improves the tribocharging characteristics of the pigment. In another embodiment the additive may be, for example, an acetate ester of a polyethylene-polyethylene oxide copolymer such as X5175 from Baker Petrolite. The additive need not be charge control additives, but improve the charging characteristics of the pigment. The droplets released from the edge of the moving substrate or spinning disk with charged pigment particles dispersed in the melted polymeric matrix may form particles that are spheroidally shaped, ellipsoidal, substantially spherical, spherical, or a combination of these shapes. Other particle shapes are also possible. The droplets that form electrophoretic particles and include the charged pigment particles dispersed in the melted polymeric matrix may have a largest dimension of about 250 microns or less; for substantially spherical particles this can be a diameter of 250 microns or less. In one embodiment the electrophoretic particles may have a largest size of from about 0.1 microns to about 250 microns. In another embodiment the electrophoretic particles may have a largest size of about 1 to about 10 microns. In one embodiment, the droplets of charged pigment particles dispersed in the melted polymeric matrix form substantially spherical balls. As an example, these substantially spherical electrophoretic balls when incorporated into an electrophoretic display device as a suspension may provide a switching time in a cell with about 300 micrometer average spacing between the electrodes of less than about 200 microseconds when the spherical balls are dispersed in an about 1 centistoke dielectric fluid and a square wave of about −300 to about +300 volts is applied to the cell electrodes.

One embodiment of an electrophoretic display can include a cell having two opposed conductive plates separated from each other by an insulator to form a sealed, such as a fluidly sealed, gas sealed, or airtight sealed, cavity between the plates. Each plate has one or more electrodes, where the electrodes can be independently addressable, and where at least one of the plates and the one or more electrodes are at least substantially transparent. The cell cavity may include a suspension of an inert dielectric fluid mixed or combined with one or more triboelectrically charged encapsulated pigment particles. The dielectric fluid may include a dye and a single type of electrophoretic particle (one-particle system). The dielectric fluid may include a first color or achromatic color of electrophoretic particle that is positively charged and a second color or achromatic color of electrophoretic particle that is negatively charged. The individual electrophoretic particles may be nearly neutrally buoyant in the dielectric fluid, free of a charge control agent, and include charged pigment particles dispersed in a polymeric matrix or a polymeric matrix charged by triboelectric charging. In one embodiment, the pigment particles dispersed in the polymer matrix are triboelectrically charged.

In one embodiment, the device with the triboelectrically charged pigment particles in the polymeric matrix may have a contrast ratio that may range from about 5:1 to about 50:1, and the switching time can range from about 50 milliseconds to about 500 milliseconds. In another embodiment of the device, the electrophoretic particles of first and second color or achromatic color are suspended in a second dielectric fluid and encapsulated by a polymer shell to form one or more capsules, the capsules positioned between the cell plates of the device.

Advantageously the methods and particles prepared by the methods may simplify the display manufacturing process and reduce or eliminate a charge control agent in the composition or manufacturing process. These coated triboelectric particles may be used in electrophoretic based digital document media for a high resolution electronic paper display.

In an embodiment, the particles made by the present method may be nearly 100% spherical that provides high quality packing and good optical performance. In addition, the pigmented particles may be embedded inside a hard, chemically inert and low surface energy polywax matrix, which may minimize particle agglomeration. In some embodiments, the present process can produces particles with size from about 250 microns down to about 10 microns through adjustments the spinning rate so that no chemical change in formulation is required.

In some embodiments, the triboelectric particles may be used for electrophoretic based digital display media and for electronic paper display with active matrix drivers.

These and other features, aspects, and advantages of the present invention will become better understood with regard to the following description, appended claims, and accompanying drawings.

DETAILED DESCRIPTION

As used herein, electrophoresis means the movement of charged particles suspended in a suspending fluid under the influence of an applied electric field. If the electric field is applied between electrodes in a cell, the particles may migrate, depending on their polarity, to either the cathode or the anode while the suspending fluid may remain substantially stationary. When a coincident voltage is applied to selected electrodes, the particles in the suspending fluid may migrate under the influence of the electric field to the electrode having a polarity opposite from their own. Since the selection of electrodes may generally relate to an image or pattern, the particles may form an image or pattern.

As used herein, the terms "triboelectrically charged" and "tribocharged" refer to an object that carries an electrical charge that was produced by friction.

One embodiment of an electrophoretic particle composition may include one or more triboelectrically charged pigment particles dispersed in a polymer matrix. The one or more triboelectrically charged pigment particles may be dispersed in the polymer matrix without using solvents. The pigment particles may be triboelectrically charged by movement or flow in a heated thermoplastic material, such as a melted polymer, that travels across a heated surface such as a spinning surface during the electrophoretic particle manufacturing process.

To make the electrophoretic particles, the polymer matrix with the pigment particles may be subject to mixing and friction through methods including but not limited to spreading the heated thermoplastic polymeric material and pigment particles across a heated substrate; heating the matrix and pigment particles and spinning them on a spinning disk; and/or releasing them in a liquid state as a droplet from a spinning disk. The spreadable or liquid matrix with dispersed charged particles may form solid electrophoretic particles by cooling the thermoplastic material below its glass transition temperature to set the charged pigment particles in the thermoplastic material. In an embodiment, the electrophoretic particles may be substantially spherical particles that may be nearly neutrally buoyant in a dielectric fluid when used in an electrophoretic display.

The thermoplastic polymer that disperses the charged pigment particles may be a material that has a low melt viscosity and that permits the triboelectric charging of the pigment particles as the mixture of polymer melt and pigment particles moves across a heated substrate and become charged. The thermoplastic polymer may also become triboelectrically charged. In one embodiment, the polymer that the charged pigment particles are dispersed in may be one that has a low melt viscosity and that permits the triboelectric charging of the pigment particles as the mixture of polymer melt and pigment particles moves across a spinning or rotating disk. The amount of the pigment particles in the microcrystalline wax or other base polymer may be chosen to provide the electrophoretic particle with a useful electrophoretic mobility and a density for its intended use. The polymer matrix need not contain a charge control agent to charge the particles, and the pigments do not require a coating or charge control agent. In addition, the electrophoretic particles can be prepared without the use of solvents. In one version, one or more dyes may be used to color the wax or thermoplastic to give colored triboelectrically charged electrophoretic particles.

The base polymer that forms the matrix in which the triboelectrically charged particles are dispersed can be a thermoplastic, a synthetic microcrystalline wax, a crystalline polyethylene wax, or other wax-like materials that may have a melting point in the range of about 50° C. to about 200° C. and a sharp melting/crystallization temperature of less than about 5° C. Other examples of base polymers include: waxes such as carnauba wax, candelia wax, castor wax, or the like.

The term "wax" is utilized herein to refer to a low-melting organic mixture of compound of high molecular weight, solid at room temperature, and generally similar in composition to fats and oils except that it contains no glycerides. Some are hydrocarbons, others are esters of fatty acids and alcohols. They are classed among the lipids. Waxes are thermoplastic, but because they are not high polymers, they are not considered in the family of plastics. Common properties, are water repellency, smooth texture, low toxicity, freedom from objectionable odor and color. They are combustible and have good dielectric properties; soluble in most organic solvents, insoluble in water. The major types are as follows: Natural: (1)Animal (beeswax, lanolin, shellac wax, Chinese insect wax); (2) Vegetable (carnauba, candelilla, bayberry, sugar cane); (3) Mineral: Fossil or earth waxes (ozocerite, ceresin, montan); Petroleum waxes (paraffin, micro-crystalline) (slack or scale wax). Synthetic: (1) Ethylenic polymers and polyol ether-esters ("Carboxwax," sorbitol); (2) Chlorinated naphthalenes ("Halowax"); (3) Hydrocarbon type, i.e., Fischer-Tropsch synthesis.

Examples of such commercially available materials and their sources include polyethylene and polypropylene waxes and their modified derivatives. One example of a polyethylene wax is Polywax 1000, manufactured by the Baker-Petrolite Corporation. This material is a nearly crystalline polyethylene wax with a narrow molecular weight distribution, and, consequently, a narrow melt distribution. This material retains a low melt viscosity until just above the melting temperature, a desirable property for the spherodization of the particles. Other examples include lower molecular weight Polywax materials, such as Polywax 400, Polywax 500, Polywax 600, Polywax 655, Polywax 725, Polywax 850, as well as higher molecular weight Polywax materials such as Polywax 2000, and Polywax 3000. Other examples of commercially available polyethylene waxes include members of the Licowax product line, available from Clariant. Examples of such materials include: LIcowax PA520 S, Licowax PE130, and Licowax PE520, as well as micronized polyethylene waxes such as Ceridust 230, Ceridust 3615, Ceridust 3620, and Ceridust 6071.

Examples of commercially available montan waxes include Licolub CaW 3, Licowax E, Licowax OP, all available from Clariant.

A commercially available synthetic form of carnauba wax is Petronauba C, available from Baker-Petrolite Corporation.

Examples of polypropylene waxes include Licomont AR504, Licowax PP230, Ceridust 6071, Ceridust 6072, Ceridust 6721 (Clariant).

Examples of modified polyethylene waxes include linear alcohol waxes such as: Unilin alcohols including Unilin 350, Unilin 425, Unilin 550 and Unilin 700 (Baker-Petrolite Corporation); linear carboxylic acid such as Unicid carboxylic acid polymers including Unicid 350, Unicid 425, Unicid 550, and Unicid 700 (Baker-Petrolite Corporation); oxidized polymer materials such as Cardis 314, Cardis 36, Cardis 320 (Baker-Petrolite Corporation) and oxidized polyethylene waxes such as Petrolite C-8500, Petrolite C-7500, Petrolite E-2020, Petrolite C-9500, Petrolite E-1040 (Baker-Petrolite Corporation).

Furthermore, in addition to waxes, different polymer materials, including other low polymers, can also be utilized herein so long as the desired properties and characteristics are produced thereby. Examples of such additional polymers include, but are not limited to, maleic anhydride-ethylene copolymers, maleic anhydride polypropylene copolymers, nylons, polyesters, polystyrene, poly(chloromethylstyrene), and acrylates such as polymethylmethacrylate.

Commercially available examples of maleic anhydride-ethylene copolymers include Ceramer polymers such as Ceramer 1608, Ceramer 1251, Ceramer 67, and Ceramer 5005 (Baker-Petrolite Corporation)

Commercially available examples of maleic functional polypropylene polymers include X-10036 and X-10016 (Baker-Petrolite Corporation)

Commercially available examples of propylene-ethylene copolymers include Petrolite copolymers such as Petrolite EP-700, Petrolite EP-1104, Petrolite EP-1100, Petrolite EP-1200 (Baker-Petrolite Corporation)

In an embodiment, the base polymer has a low melt viscosity, for example in the range of about 10 to about 100 centipoise when used to disperse the charged pigments. In another embodiment, the base polymer has a low melt viscosity, for example in the range of about 30 to about 50 centipoise when used to disperse the charged pigments. In one embodiment the thermoplastic may have a viscosity below about 50 centipoise at a temperature of below about 150° C. An example of a material that can be used as a base polymer is a polyethylene was, such as Polywax 1000 from Baker Petrolite. These properties, a sharp melt transition about 5° C. or less and low melt viscosity, ease the flow of melted wax on the spinning disc and aid in spherical droplet formation and subsequent sphere formation. The size of particles formed by the droplets of polymer and charged pigment depends upon the speed of the fluid flowing across the heated substrate. The particle size may depend inversely on the rotating speed of the disc and may depend on the melt viscosity of the pigmented wax. For example, spinning a disk with a diameter of from about a 4 centimeter to about an 8 centimeter at about 5000 to about 6000 rotations per minute of can be used to form micron sized particles. Other rotational speeds are also possible for making the spherical particles. In one embodiment the particles are about 1 to about 2 microns in size, and in another embodiment the particles are about 3 to about 5 microns in size. The melt viscosity of pigmented wax can be decreased by using low molecular weight polyethylene, for example Polywax 850 or Polywax 725, although other materials to modify the melt viscosity with different molecular weights or molecular weight distributions may also be used.

The particles and material fabrication process can be extended to other higher temperature polymer bases such as PW2000 from Baker Petrolite. These higher temperature melting thermoplastic polymers can be used for high temperature electrophoretic display applications. The heated moving substrate, for example a spinning disk with a shroud heater, can be brought to a temperature at which the viscosity of the melt is in the range of about 30 to about 50 centipoise. These higher temperature materials may eliminate the special cold lamination and post heating process that are often used for two-particle systems to make them stable at high temperatures. In one embodiment the particles are stable up to about 90° C. and in other embodiments the particle may be stable up to about 100° C. or more.

Suitable pigments for use in the electrophoretic particle compositions are those that can be triboelectrically charged. Suitable pigments may include for example $TiO_2$, $ZrO_2$, ZnO, $Al_2O_3$, $BaSO_4$, $CaCO_3$, organic pigments, organometallics, other pigments and combinations of these. In one embodiment, pigments that are chemically and physically compatible with the encapsulating polymer or dielectric fluid and are triboelectrically charged in a polymer matrix. Examples of pigments include but are not limited to the black pigment Ferro 6331 from Ferro Inc., which can be positively tribocharged, or a white titania pigment such as titania R104 from E.I. DuPont deNemours & Co. which can be tribocharged negatively. Other suitable colorants may include black colorants like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like; suitable colored pigments or colorants may include, but are not limited to, cyan, magenta, yellow, red, green, brown, blue colorants or mixtures thereof; other examples of pigments include phthalocyanine HELIOGEN BLUE L6900™, L7020™, D6840™, D7080™, D7020™, K6910™, and K7020™, available from BASF, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like; colorants that may be selected are black, cyan, magenta, or yellow, and mixtures thereof; examples of magentas that may be used are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like; examples of cyans that may be used include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be used are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants; other known colorants that may be selected, such as Levanyl Black A-SF (Miles, Bayer) and Sunsperse Carbon Black LHD 9303 (Sun Chemicals), Paliogen Black L9984 9BASF), Pigment Black K801 (BASF) and carbon blacks such as REGAL 330, REGAL 660 (Cabot), Carbon Black 5250 and 5750 (Columbian Chemicals), and colored dyes such as Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Scarlet for Thermoplast NSD Red (Aldrich), Neopen Blue FF4012 (BASF), Sudan Blue OS (BASF), PV Fast Blue B2GO1 (American Hoechst), Sunsperse Blue BHD 6000 (Sun Chemicals), Irgalite Blue BCA (Ciba-Geigy), Paliogen Blue 6470 (BASF), Sudan II (Matheson, Coleman, Bell), Sudan III (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1, and FGL (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Sico Fast Yellow D1165, D1355, and D1351 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). The triboelectric series can be used as a guide for selecting materials like the pigment. The average size of the chargeable pigment particles may be in the range of from about 0.05 microns to about 10 microns, although other pigment sizes are also possible. By choice of pigment material, the pigment particles can be made with a desired magnitude of charge and polarity.

The pigment particles can have any color or achromatic color useful in a display device. Black, white and gray are not true colors (or hues), they are considered to be neutral, achromatic colors. Pigments that are complementary to each other or to a dye in a dielectric fluid used in a display device can be used to make electrophoretic particles by triboelectric charging.

Additives, for example X5175 which may be obtained from Baker Petrolite Corp and which is an acetate ester of a copolymer of polyethylene and polyethylene oxide with the generic formula $CH_3CH_2-(CH_2CH_2)_y(OCH_2CH_2)_x-OCOCH_3$, where y is approximately 13-17 and x is approximately 30-50 (also referred to as the acetate ester of Unithox 480), can be used to improve the tribocharging characteristics of the pigment particles, such as Ferro 6331 or other black pigments. These and other similar agent or additives are not charge control agents and may optionally be added to a mixture of pigment and heated wax to improve the tribocharging characteristics of the mixture.

To form images, electrophoretic displays use a composition that may include a suspension of neutrally buoyant electrophoretic particles, for example triboelectrically charged pigment particles dispersed within a thermoplastic microcrystalline wax or other base polymer, in a dielectric fluid. The electrophoretic particles of physically charged pigment particles embedded in the thermoplastic microcrystalline wax minimize agglomeration or do not agglomerate with each other when suspended in a dielectric fluid at a concentration used in an electrophoretic display. The concentration or amount of these electrophoretic particles in the dielectric fluid may be chosen to provide coverage of the cell and contrast for use. In one embodiment the concentration or amount of these electrophoretic particles in the dielectric fluid may be may be in the range of from about 1% to about 20% of the mass of the dielectric fluid. In another embodiment the concentration or amount of these electrophoretic particles in the dielectric fluid may be in the range of from about 1% to about 30% of the mass of the dielectric fluid. In one embodiment the dielectric fluid may have a kinematic viscosity in the range of about 0.25 centistoke to about 10 centistoke. In another embodiment the dielectric fluid may have a kinematic viscosity in the range of about 1 centistoke to about 2 centistoke. Fluids, such as halogenated organic solvents, saturated linear or branched hydrocarbons, silicone oils, and low molecular weight halogen-containing polymers and combinations of these are some useful dielectric fluids for electrophoretic particles displays. The dielectric fluid may include a dye for one-particle systems. Oppositely charged pigment particles coated with a thermoplastic microcrystalline wax do not agglomerate with each other when suspended in a dielectric fluid at a concentration used in an electrophoretic display. The composition can also include coloring dyes, defoamers and/or other additives used for assembling an electrophoretic display cell.

Figure 1:
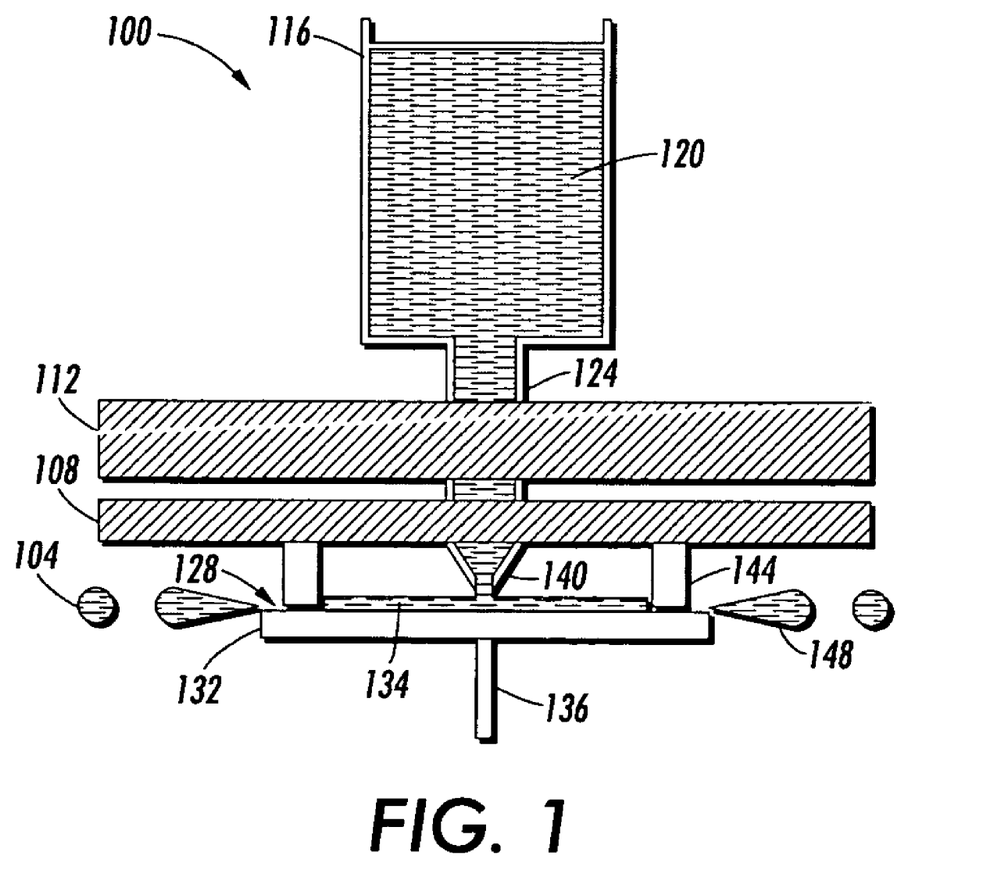
FIG. 1 illustrates a schematic setup of an apparatus that may be used to make polymer coated charged pigment particles.

FIG. 1 illustrates an example of a system with a heated substrate 132 that melted thermoplastic material and pigment 120 moves across to form electrophoretic particles 104. In FIG. 1, the device may include a polymer melt reservoir 116 that dispenses heater polymer with pigment particles 120, a spinning disc 132 that triboelectrically charges the pigment and forms droplets 104 of the melted polymer, a shroud heater 112 for heating the polymer 134 on the disk, and a nozzle 124 with opening 140 positioned above the spinning disk 132 that can be used to dispense a mixture of a melted thermoplastic polymer and pigment 120 onto the spinning disk. The spinning disk 132 may be mounted upon a rotatable spindle 136. The shroud 144 serves to prevent premature cooling and solidification of the melted polymer A narrow slit 128 between the shroud 144 and disk 132 is where the pigment/polymer droplets/particles are ejected. The shroud 144 may also serve to minimize any air turbulence that may interfere with particle 104 preparation. The liquid and pigment are moved to the periphery of the disk 132 under the influence of centrifugal force where it separates to form droplets 148 that form particles 104. A disk that is about 4 cm to about 8 cm in diameter and about 0.0125 to about 0.0250 centimeters thick may be rotated at about 5000 to about 6000 rotations per minute successfully to produces balls about 100 microns or less in diameter. Optionally, the edge of the disk may be contoured to manipulate the release and size of droplets formed by the heated liquid, for example the disk edge may be square, rounded, tapered, or an other shaped edge.

A liquid supply or reservoir 116 may be used to heat and supply the fluid polymeric material to the moving substrate 132. The reservoir 116 may be heated, such as to a temperature above the glass transition temperature of the wax or thermoplastic, and maintained at the temperature using a suitable heating system, such as a controller and thermocouple. In one embodiment the pigment and thermoplastic or base polymer may be added as a mixture to the reservoir by volume or weight percentage in the range of about 5 wt % to about 40 wt %. In another embodiment the pigment and thermoplastic or base polymer may be added as a mixture to the reservoir by volume or weight percentage in the range of about 15 wt % to about 30 wt %. Optionally, the mixture may be mixed in the reservoir using a paddle wheel and stir shaft feedthrough to contact the liquid in the reservoir 116.

The nozzle 124 may also be heated by any suitable heating device. The nozzle may include a heated or unheated metering valve to automatically or manually control the flow rate or amount of liquid with dispersed pigment delivered to the substrate 132. The flow of polymer from the reservoir to the moving substrate may be achieved using a gear pump or a pressurized gas in contact with the molten polymer and pigment in the reservoir. The metering valve may be used to control the flow of material to the substrate. The nozzle tip 140 diameter, tip shape, and distance from the moving substrate may be modified to produce the desired fluid profile 134 onto the moving substrate 132.

The pigmented liquids 120 may be delivered to the metering members in a heated, molten state so that they flow freely and do not harden prematurely, i.e. long enough to prevent the ligaments from freezing. In one embodiment the pigmented liquids 120 may be delivered to the metering members in a heated, molten state at a temperature of from about 100° C. to about 200° C. In another embodiment the pigmented liquids 120 may be delivered to the metering members in a heated, molten state at a temperature of from about 115° C. to about 140° C. A heating coil or other heating device may be placed in contact with the stationary liquid delivery assembly. It has been found that with liquid wax, O-rings made of a fluorocarbon rubber such as Viton (trademark of E.I. DuPont de Nemours & Co.) may be appropriate to withstand the required temperature and, in fact, are lubricated by the liquid. A shroud heater 112 may be used to keep the viscosity of the melt in a working range during the spinning and charging process. A pressure head of about 1 to about 40 pounds per square inch (psi), or from about 5 to about 10 psi may be used for feeding the liquids through their respective paths, to fill the reservoirs and to feed them uniformly through metering slots 140 at a thickness of about 0.05 to about 2 mm, or from about 0.1 to about 1 mm onto the surfaces of the moving substrate or disk 132. In one version, the pigmented polymer melt may be metered onto a rotating substrate 132 that triboelectrically charges pigment particles in the polymer melt 120 to form ligaments 148 and, finally, form electrophoretic balls 104.

The liquid material released from the moving substrate should not solidify prematurely. In an embodiment, the balls should solidify soon, and preferably as soon as possible, after formation. Cooling may be accelerated by the having the balls pass through a cooling zone accomplished by providing a cooled gas or cooled surfaces near the edge of the substrate where the droplets are formed. The temperature may be a gradient to slowly harden the triboelectrically charged particles at an appropriate location (desired shape achieved).

The size the electrophoretic particles may be modified by changing the diameter of the disk, the disk's rotation rate, the molecular weight and distribution of the polymer, and/or the viscosity of the melted polymer when heated. The particle size can be used to modify the response of the particle to the external field in an electrophoretic device.

The size and density of the charged pigment particles dispersed in the thermoplastic may be used to control the electrophoretic mobility. The electrophoretic mobility of the coated charged particles can be on the order of about $10^{-4}$ to about $10^{-6}$ cm$^2$ sec$^{-1}$V$^{-1}$. The thickness of the coating may be modified to control the buoyancy of the particles. In one embodiment the triboelectric particles may be suspended in a dielectric fluid such that the particles do not float or sink in the fluid.

The substrate material and surface finish, viscosity of the melt, and/or pigment type can be varied to modify the contact area frictional forces and amount of charge transferred during triboelectric charging. Other variables such as material work function, back flow of charge and gas breakdown can affect the amount of charge transferred to the pigment. These variables can be modified by choice of material and processing conditions like rotation rate, to tailor the charge transferred between the substrate and pigment.

Without wishing to be bound by theory, the charging of the particles prepared in versions of the present method and materials may occur for example when the pigmented polymer melt contacts and moves across the high speed rotating spinning plate. Once the charged pigmented polymer melt leave the disc, the polymer melt may form into a droplet which freezes into a sphere or substantially spherical particle and the triboelectric charge is trapped in the polymer matrix. The sign and magnitude of the charge of the electrophoretic particles may be modified by the polymer melt formulation and omission of additional charge control agents.

Spherical two-particle electrophoretic display systems may have better optical bistability than one-particle systems because in the two-particle systems the electrophoretic particles can fall from the top electrode and land on top of other particles without loss of contrast. For example, black particles on white particles or vice versa. However in one-particle systems, once the particles fall from the top electrode, the contrast is lost.

Figure 4:
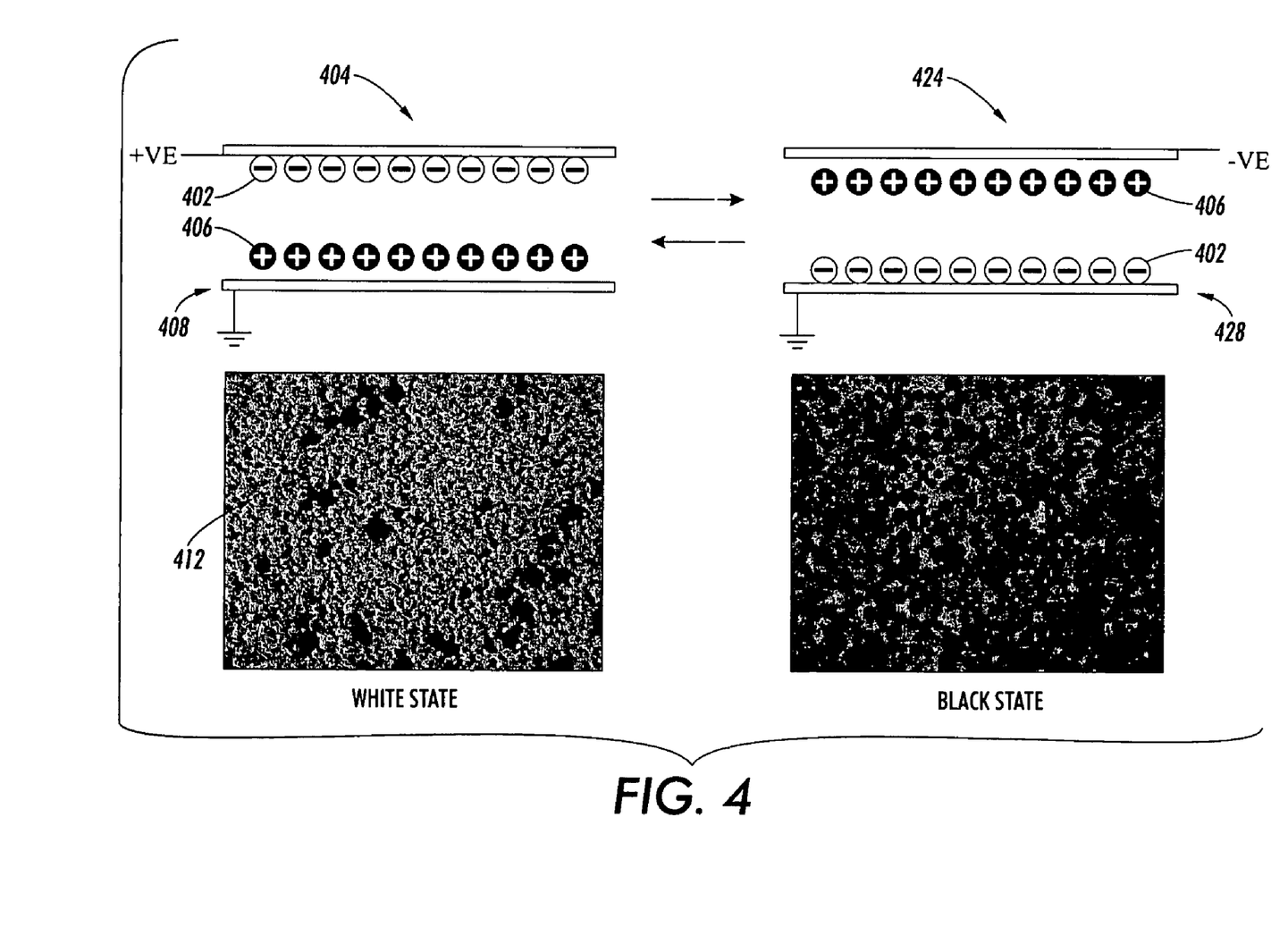
FIG. 4 shows an illustration and optical micrographs of two particle devices in the white(A) and black (B) state.

FIG. 4 illustrates a change in the state of a display using triboelectrically charged particles. The negatively charged white particles 402 are attracted to the top transparent positive electrode 404 while positively charged black particles 406 are attracted to the negative or ground electrode 408 and the image appears white. When the electric field is changed the positive black particles 406 are attracted to the negatively charged top electrode 424 while the negatively charged white triboelectrically charged particles are attracted to the bottom relatively positively charged bottom electrode 428 and the image appears black.

The present imaging particles may provide a solvent-less single step process to provide a large quantity of small spherical particles that have a charged pigment particles embedded in the polymer sphere. The final electrophoretic particle size can be controlled by different viscosity of pigmented polymer melt and different rotations per minute of the disc (spinning speed and size of the disk) The particle charge is built inside the spheres through tribocharging and an additional charge control additive is not required.

Figure 2A:
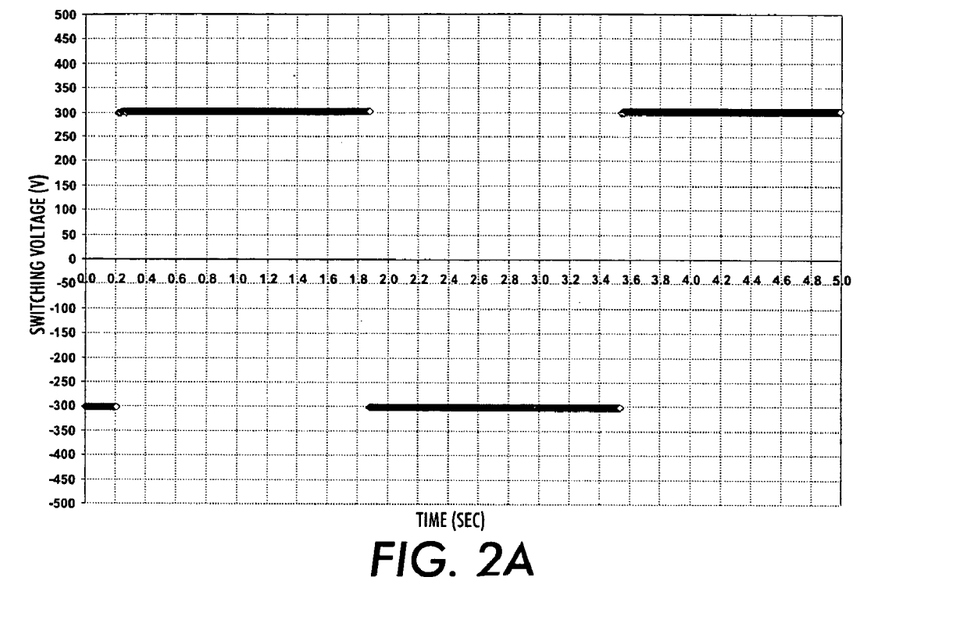
FIG. 2 presents graphs of dynamic reflectivity measurements.
Figure 2B:
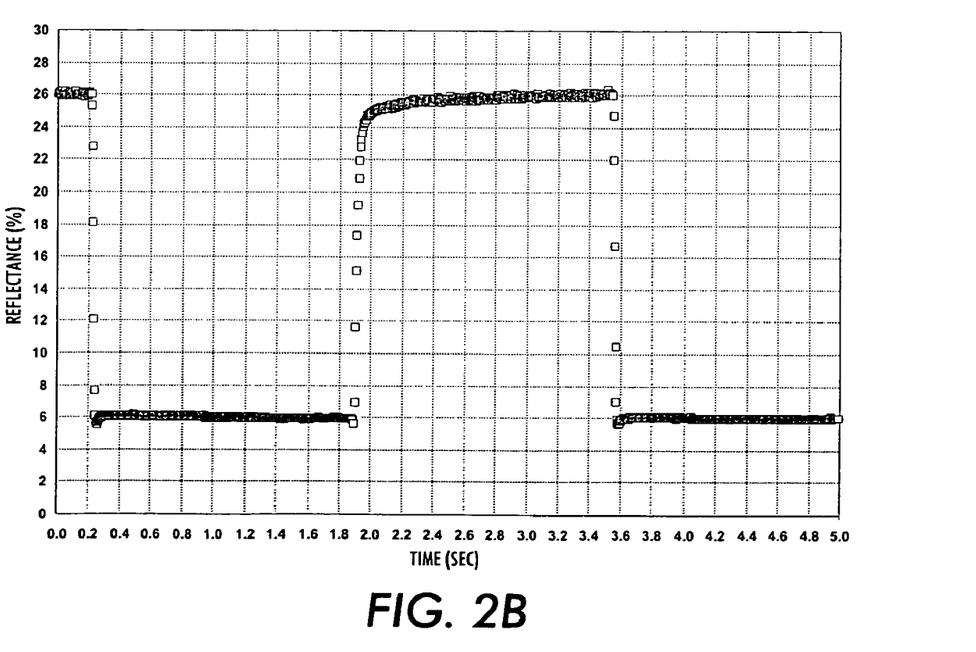
Figure 3A:
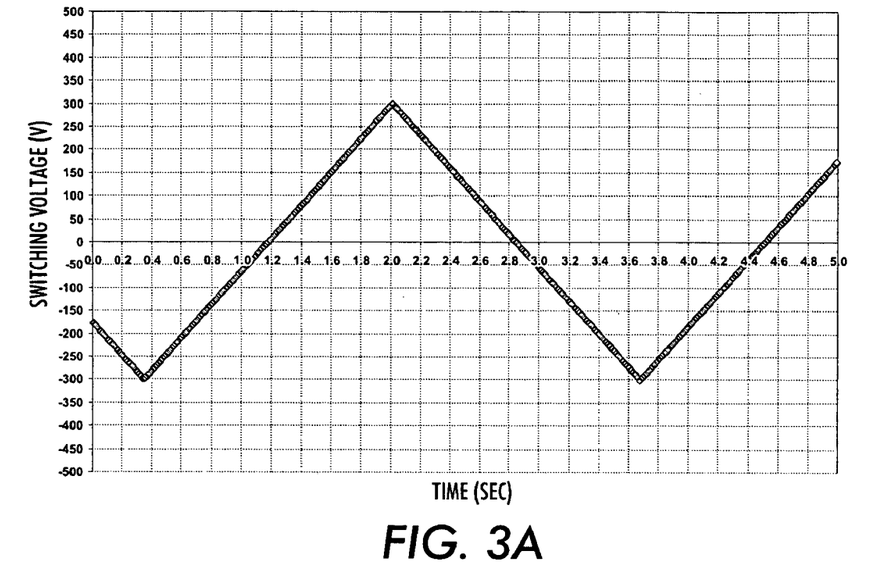
FIG. 3 illustrates results of dynamic current measurements.
Figure 3B:
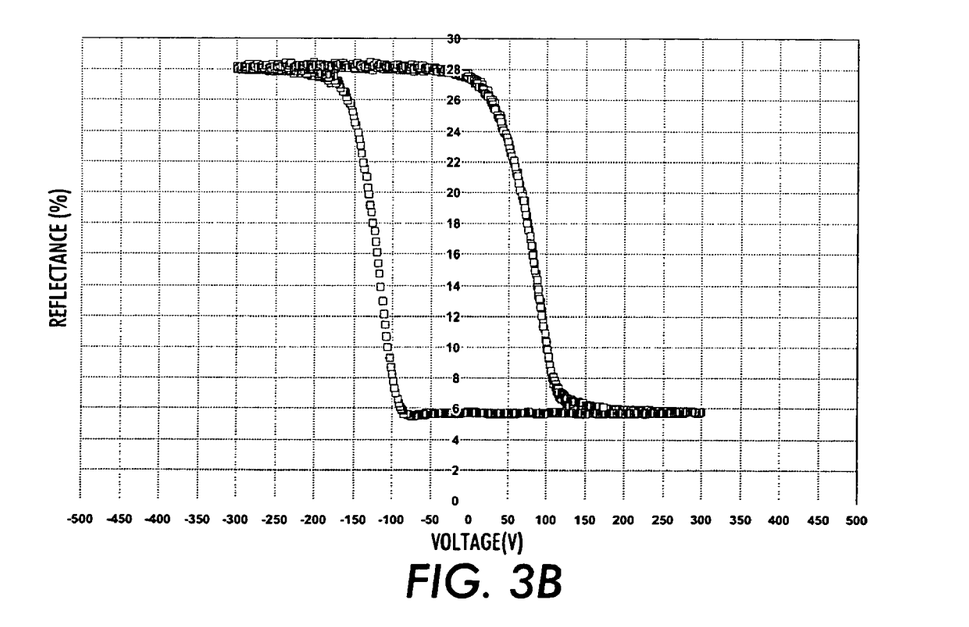

The optical performance of the two-particle electrophoretic devices may be monitored by dynamic reflectivity as shown in FIG. 2, and dynamic current as shown in FIG. 3. In FIG. 2, a square wave of about +300 volts to about −300 volts may be applied across the device (A) and the variation in reflectivity against time may be simultaneously monitored in real time by a densitometer (B). In the embodiment shown in FIG. 2, the white reflectivity may be as high as about 28% and the black reflectivity may be about 6%. The contrast ratio may be about 4.7. The switching time may be less than about 200 ms. In FIG. 3, a saw-tooth wave form is applied across the device (A). The variation in reflectivity against applied voltage is plotted (B). The maximum reflectivity in this example is attained at about 150 volts. Without wishing to be bound by theory, this transition may be further sharpened by using more uniform size particles. In one embodiment the particles used to form the device have sizes that are within about 10% or less of each other. In another embodiment the particles used to form the device have sizes that are within about 5% or less of each other.

One embodiment includes fabricating display devices using capsules. In this embodiment two differently colored or different achromatic colored and charged ink particles are encapsulated by a polymeric binder. For example, oppositely charged micron sized electrophoretic particles, for example from about 1 to about 50 microns, containing tribelectrically charged black or white pigments in a polymer matrix may be dispersed in a hydrocarbon solvent. For example ink and capsule preparation may include less than about 10% by weight of black and less than about 10% of white electrophoretic particles dispersed in a hydrocarbon based dielectric fluid like Isopar M ®. The prepared ink may be encapsulated for example via complex coacervation with gelatin-polyphosphate, gelatin-gum Arabic, or other suitable composition. The microcapsules can be cross linked to furnish wet deformable capsules. The capsules may be wet sieved to obtain the fraction containing the desired size capsules.

In coacervation, a continuous shell is formed when a water soluble polymer is condensed from an aqueous solution. The shell forms about a nucleus of material which becomes the core. Shells of this type based on gelatin and gum arabic are well known. "In situ" polymerization is a second commonly employed technique for producing microencapsulated beads. A shell formed of a gaseous, liquid, water or oil soluble monomer or a low molecular weight polymer is polymerized on the surface of a core material to provide a polymer film which covers the entire surface of the core material. Shells based upon urea-formaldehyde are well known. A variety of materials including homopolymers, copolymers, graft copolymers and block copolymers may be used to form the shell.

The term neutrally buoyant refers to the condition where the buoyant force equals the weight of the particle As noted above, in various versions of electrophoretic particle compositions, the encapsulated particles are generally neutrally buoyant with respect to the liquid dielectric medium. This can be achieved by selectively mixing the pigment particles and the polymer matrix according to a selected volumetric ratio so that the density of the particles is close enough to the density of the dielectric fluid for the particles to be neutrally buoyant. In one embodiment, the density of the particles may be equal to, or within about five percent of, that of the insulating medium. Settling out of the particles in the display may be greatly reduced or eliminated during periods of non-use.

An electrophoretic device may be fabricated using these capsules. Wet capsules may be filtered through a filter and mixed with a solution containing a soluble polymer, defoamer, and a plasticizer for the polymer. A number of different soluble polymer films can be used. A film may be formed on an indium tin oxide (ITO) Mylar substrate on the conductive side by spreading the capsules with a blade of appropriate gap, in such a way to obtain a monolayer of highly packed capsules. The film may be dried at room temperature. The capsules may be surrounded by a liquid phase which has substantially the same composition as the suspending liquid within the capsules. The spacing between the plates can also be maintained using spacers. The plates can be sealed to each other around their peripheries to prevent the liquid external phase from flowing out of the display. The capsule film may be coated with a waterbase polyurethane glue or other glue by using a blade and then dried. The two substrates can be laminated together to provide the final device which switches between black and white states. The encapsulated two-particle inking may provide the device with flexibility and high coverage of active switching media.

For electrophoretic displays with triboelectrically charged electrophoretic particles using achromatic colored pigments, embodiments can have a white reflectivity of about 25% or higher and a black reflectivity of about 10% or lower. In some embodiments the white reflectivity may be up to about 60% to about 70%. In other embodiments the black reflectivity may be from about 1% to about 2% or less. In one embodiment the contrast ratio may be about 2.5:1 or higher. In another embodiment the contrast ratio may be at least about 30:1. In another embodiment the contrast ratio may be at least about 50:1. Embodiments of electrophoretic displays with triboelectrically charged electrophoretic particles may have a switching time that is less than about 200 milliseconds, or a switching time that can be used for video display. In one embodiment the switching time may be about 50 milliseconds or higher (switching rate of 20 cycles/second or less).

For addressable electrodes, one or more capsules per pixel can be used. The voltage applied to any of the electrodes in the display can be independently controlled using an active matrix driver.

Figure 5:
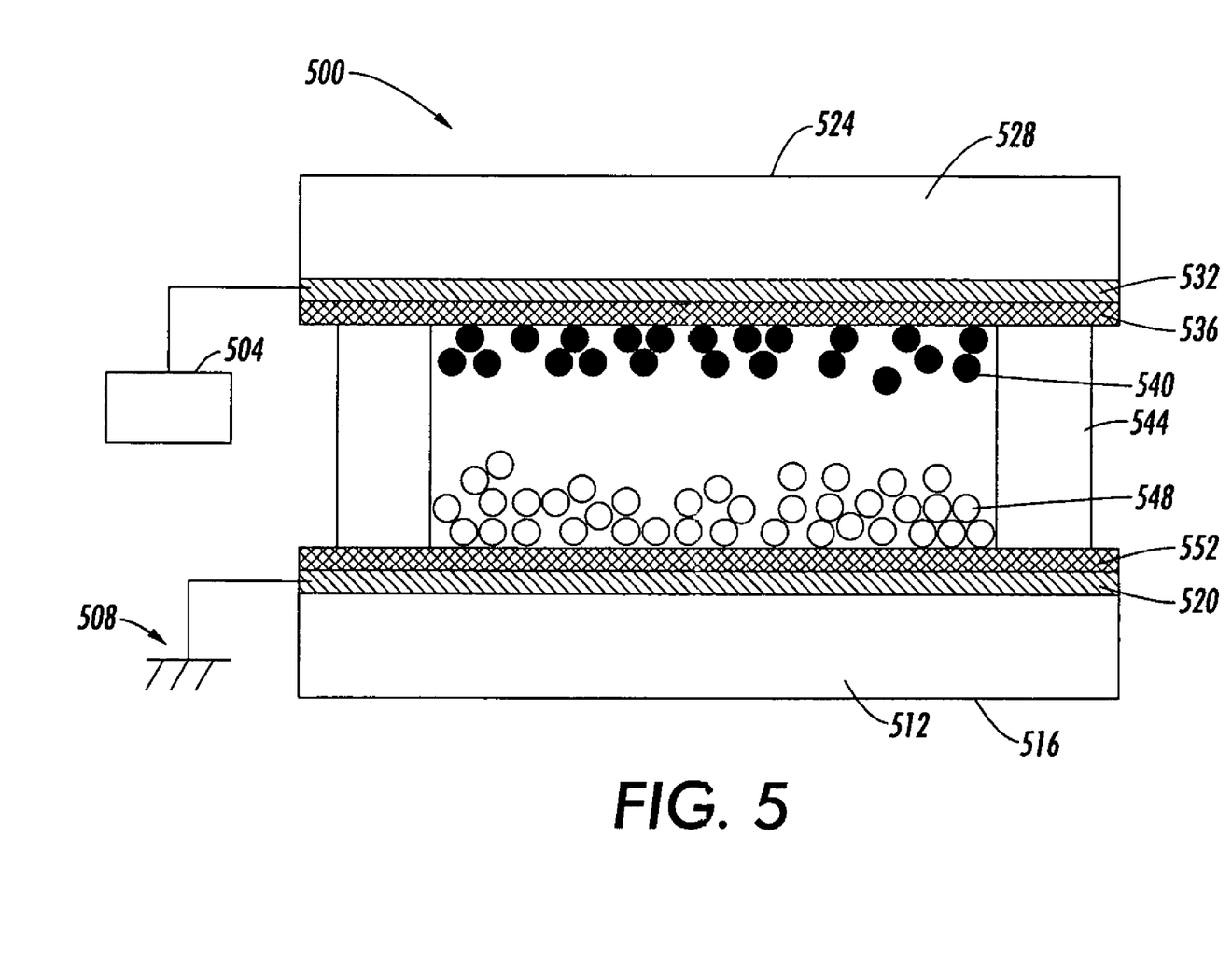
FIG. 5 is a schematic diagram of an exemplary two-particle display device.

As illustrated in FIG. 5 the front electrode 528 is negatively charged relative to the rear electrode 512 which is at ground 508. The coated triboelectrically charged electrophoretic black particles 540 are held electrostatically adjacent the front electrode 528 with outer surface 524, while the negatively charged coated triboelectrically charge white particles 548 are held electrostatically against the rear electrode 512 with surface 516. Accordingly, an observer viewing the display through the front plate sees a black pixel, since the black particles 540 are visible and hide the white particles.

In the display the front electrode is separated from the rear electrode by spacers 544. The electrode 532 is connected to a power supply 504 and electrode 520 may be connected to ground. Transparent protective layers 536 and 552 may be applied to the electrodes to chemically protect them.

Various aspects of the present invention will be illustrated with reference to the following non-limiting examples.

EXAMPLE 1

This example illustrates the preparation of triboelectrically charged particles in a thermoplastic using a moving substrate to charge the pigment particles.

White pigmented wax—30 grams of $TiO_2$ (R104 from DuPont) is dispersed in 70 g of Polywax 1000 at 130° C. by an IKA T-25 homogenized for 1 hour. Black pigmented wax—20 grams of black pigment (Ferro 6331), 3 grams of X5175 (Baker Petrolite) is dispersed in 77 g of Polywax 1000 at 130° C. by an IKA T-25 homogenizer for 1 hour.

The pigmented wax is melted and kept in the reservoir at 130-150° C. as illustrated in FIG. 1. The metal disc is spun at 5900-6000 rpm although other speeds are possible. The shroud and nozzle temperature are set at 150° C. and 130° C. respectively. The particles are collected and sieved through a 75 micron screen, then equal amounts of black and white particles are suspended in silicone 200 fluid (1 centistoke, Dow Corning silicone oils). A drop of suspension is sandwiched between two ITO plates, spacing about 300 microns, and the switching voltage is about ±(100-300) volts.

EXAMPLE 2

This example illustrates the fabrication of an electrophoretic display that incorporates capsules with one or more coated triboelectrically charged pigment particles.

One embodiment includes fabricating devices by using encapsulated 2-particle ink into a polymeric binder. Micron sized electrophoretic particles black and white, prepared as described in Example 1, are dispersed in a hydrocarbon solvent like Isopar M®. For example ink and capsule preparation includes 5 grams of a black and 5 grams of a white ink prepared as described is dispersed in 35 g of Isopar M®. The prepared ink is encapsulated via complex coacervation with gelatin-polyphosphate or gelatin-gum Arabic. The microcapsules are cross linked with gluteraldehyde to furnish wet deformable capsules. The capsules are wet sieved to obtain the desired fraction containing capsules of 212 to 180 micron size.

A device can be fabricated using the capsules. For example, 6 grams of wet capsules are filtered through a paper filter and then they are mixed with a solution containing 0.5 ml of PVA 30%, 3 drops of 1-octanol (defoamer) and 75 milligrams of glycerol (plasticized for PVA). A film was formed on an ITO/Mylar substrate (5 mils thick; about 0.0125 cm), on the conductive side by spreading the capsules with a blade of appropriate gap, in such a way to obtain a monolayer of highly packed capsules. The film is dried at room temperature overnight. The capsules deform during the dewatering process. The film is coated with NeoRez (waterbase polyurethane glue) by using a blade, then dried for one hour at 60° C. The two substrates are laminated together to provide the final device which switches between black and white states. The encapsulated two-particle ink provides the device with flexibility and high coverage of active switching media.

Although the disclosure has provided considerable detail with reference to certain preferred embodiments thereof, other versions are possible. Therefore the spirit and scope of the appended claims should not be limited to the description and the preferred versions contain within this specification.

What is claimed is:

1. A composition comprising:
   one or more triboelectrically charged pigment particles dispersed in a polymer matrix,
      wherein the particles are used in an electrophoretic display device; and
      wherein the particles provide a switching speed in an electrophoretic cell with an about 300 micrometer average spacing between electrodes of the cell of less than about 200 microseconds when the particles are dispersed in an about 1 centistoke dielectric fluid and a square wave of a range from +300 to −300 volts is applied to the cell electrodes.

2. The composition of claim 1 wherein the pigment particles comprise one or more of the following: $TiO_2$, $ZrO_2$, ZnO, $Al_2O_3$, $BaSO_4$, $CaCO_3$, an organic pigment, and an organometallic.

3. The composition of claim 1 wherein the particles have an electrophoretic mobility and density for use in an electrochromic display.

4. The composition of claim 1 further including a dielectric fluid.

5. The composition of claim 1 wherein the composition comprises at least two groups of particles having different electrophoretic properties.

* * * * *